UNITED STATES PATENT OFFICE.

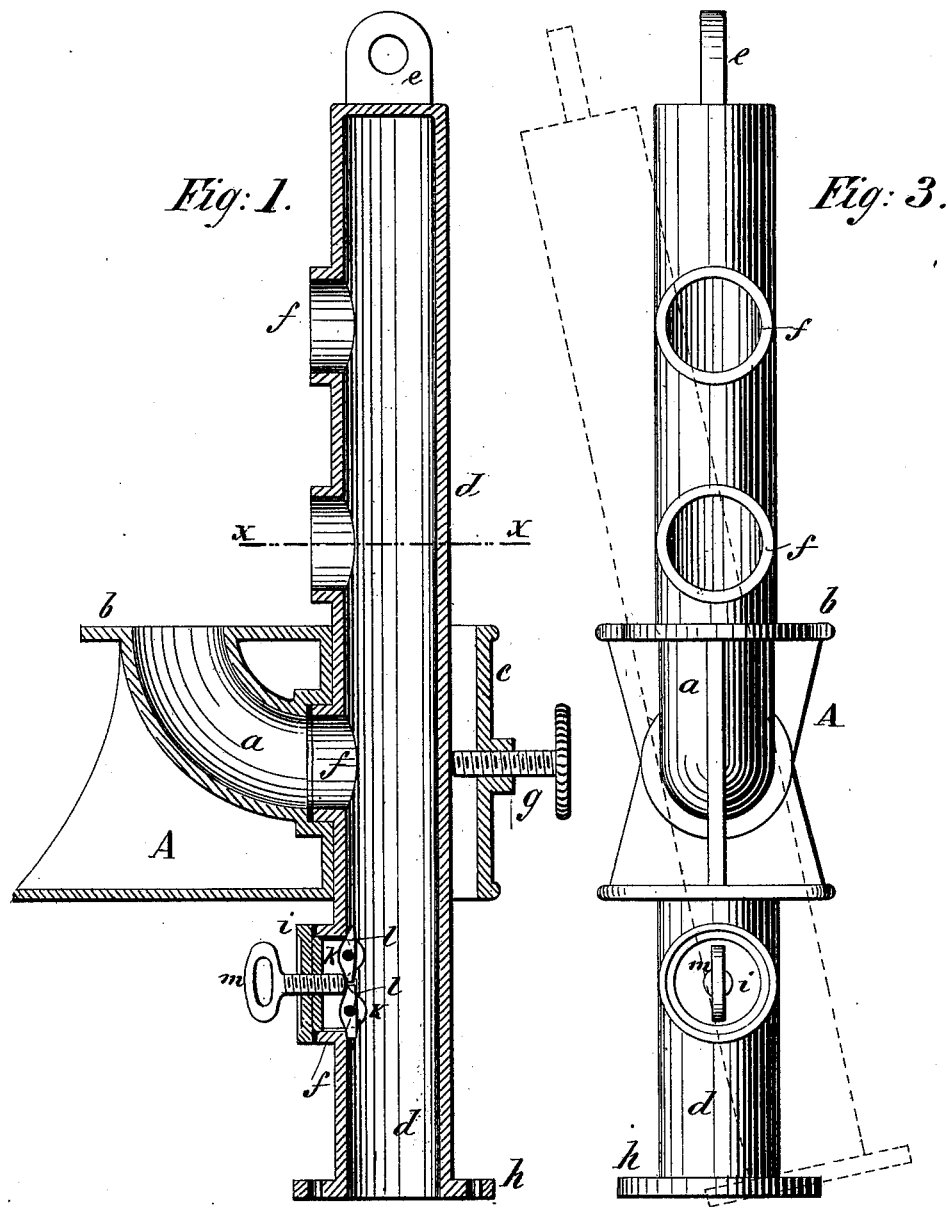

ERIC O. LEERMO, OF GOLD HILL, NEVADA.

IMPROVEMENT IN SUCTION-PIPES FOR PUMPS.

Specification forming part of Letters Patent No. 208,617, dated October 1, 1878; application filed August 23, 1878.

*To all whom it may concern:*

Be it known that I, ERIC O. LEERMO, of Gold Hill, in the county of Storey and State of Nevada, have invented a new and Improved Suction-Pipe for Pumps, of which the following is a specification:

My invention is especially intended for mines where the suction-pipe of the pump has to be shifted in position and altered in length, and where the pipe is frequently broken by the blasting operations.

My invention consists in a suction-pipe provided with a number of short branch or T pipes at intervals along its length, which is used in connection with a socket-head that supports the pipe, so that any one of said branches may connect with the pipe from the pump, according to the length desired, and the suction-pipe may be swung on said connection or disconnected and raised when blasting is to be done.

In the accompanying drawing, Figure 1 is a longitudinal section of my improved suction-pipe and socket. Fig. 2 is a cross-section at the line $x\ x$ of Fig. 1, and Fig. 3 is an elevation of the suction-pipe and socket.

Similar letters of reference indicate corresponding parts.

A represents a socket-head that is to be attached firmly to the frame-work of the mine-shaft in any desired manner. The curved pipe $a$ is formed with the head A, and is provided with a flange, $b$, for connecting the pipe that leads to the pump. (Not shown.) One side of the head A is formed as a nearly flat tube or socket, $c$, flaring from the center outward toward both ends. The inner end of pipe $a$ opens into the socket $c$ at the center, and pipe $a$ is enlarged to form an annular shoulder at the opening.

$d$ is the suction-pipe that is closed at its upper end, where an eye, $e$, is formed upon the pipe for the attachment of hoisting mechanism. $f\ f$ are short branch or T pipes or openings formed along one side of pipe $d$, a short distance apart. The pipe $d$ is held in the socket $c$ by any one of the branches F entering the enlargement at the end of pipe $a$, as shown, and by the clamping-screw $g$, which passes through the side of $c$, and bears upon pipe $d$ to hold the same in place. The lower end of pipe $d$ thus forms a continuation of the pipe $a$, longer or shorter, according to which branch $f$ connects with $a$. This connection also forms a pivot upon which the pipe may swing, as shown by dotted lines in Fig. 3. The lower end of $d$ is provided with a flange, $h$, for connecting the pipe, that may contain the valve and valve-chamber, such pipe being similar to the one shown in my patent No. 201,689, or in any other desired form.

The branch openings $f$, above and below the socket-head A, will be closed by a hand-hole plate, $i$, that fits into said openings, and has a flange which takes against the end of the branch pipe. The said plate $i$ is provided at the inside with lugs $k$, between which are pivoted two latches, $l\ l$. A thumb-screw, $m$, passing through the center of plate $i$, is used to apply pressure upon the adjoining inner ends of latches $l$ and cause their outer ends to take against the inside of pipe $d$ when the cover $i$ is in place, and bind the same tightly. By releasing the screw $g$ so as to permit the branch $f$ to disengage from pipe $a$, the suction-pipe $d$ may be drawn up out of the way when a blast is to be fired. This construction also permits the length of pipe $d$ below A to be adjusted to suit the circumstances existing, and it may also be swung to one side to change the direction. The pipe might be flat or oval to prevent its turning in the socket $c$.

I do not limit myself to the exact details of construction set forth, as they may be varied without departing from my invention.

Having thus described my invention, I claim as new and desire to secure by Letters Patent—

1. The suction-pipe $d$, provided with the branch openings $f$, in combination with the supporting socket-head A, substantially as and for the purposes set forth.

2. The socket-head A, formed with the pipe $a$ and socket or tube $c$, and having a screw, $g$, or equivalent device, substantially as and for the purposes described.

3. The combination of the socket-head A, the removable cover $i$, and the suction-pipe $d$, substantially as described.

ERIC OLSON LEERMO.

Witnesses:
W. G. HYDE,
O. H. GALLUP.